United States Patent

[11] 3,614,298

[72] Inventors John T. Thompson
244 Loring St., Los Angeles;, Calif. 90024;
George W. Gillemot, 2331 20th St., Santa Monica, Calif. 90405
[21] Appl. No. 12,819
[22] Filed Feb. 19, 1970
[45] Patented Oct. 19, 1971

[54] CABLE SPLICE CASING WITH CONDUCTIVE ANCHORAGE TO CABLE SHEATH AND SHIELD
20 Claims, 11 Drawing Figs.
[52] U.S. Cl. .................................................. 174/92,
174/88 R, 339/14 R, 339/103 R
[51] Int. Cl. .............................................. H02g 15/08
[50] Field of Search .................................... 174/88, 92,
78, 75.2, 88.2; 339/95, 103, 107, 14

[56] References Cited
UNITED STATES PATENTS
2,788,385 4/1957 Doering et al. .............. 174/92
3,061,666 10/1962 Duvall et al. ................. 174/92
3,271,505 9/1966 Dellett et al. ................. 174/92 X
3,499,972 3/1970 Smith ............................ 174/78 X Primary Examiner—Darrell L. Clay
Attorney—Sellers and Brace ABSTRACT: A cable splice casing cast in two mating halves and equipped with one or more conductive anchor assemblies for mechanically and electrically connecting the cable shield and sheath jackets to each end of the casing while the latter is open. The casing acts to interconnect the cable sheath across the splice area and to provide electrical continuity between the respective cable shield jackets. More than one cable of the same or different sizes can be readily and separately accommodated at either end of the casing. The anchorages are spaced inwardly of a sealing gasket at each end of the casing and the latter can be opened for servicing and testing without disturbing the cable anchorage or the grounding connection between the cables and the casing.

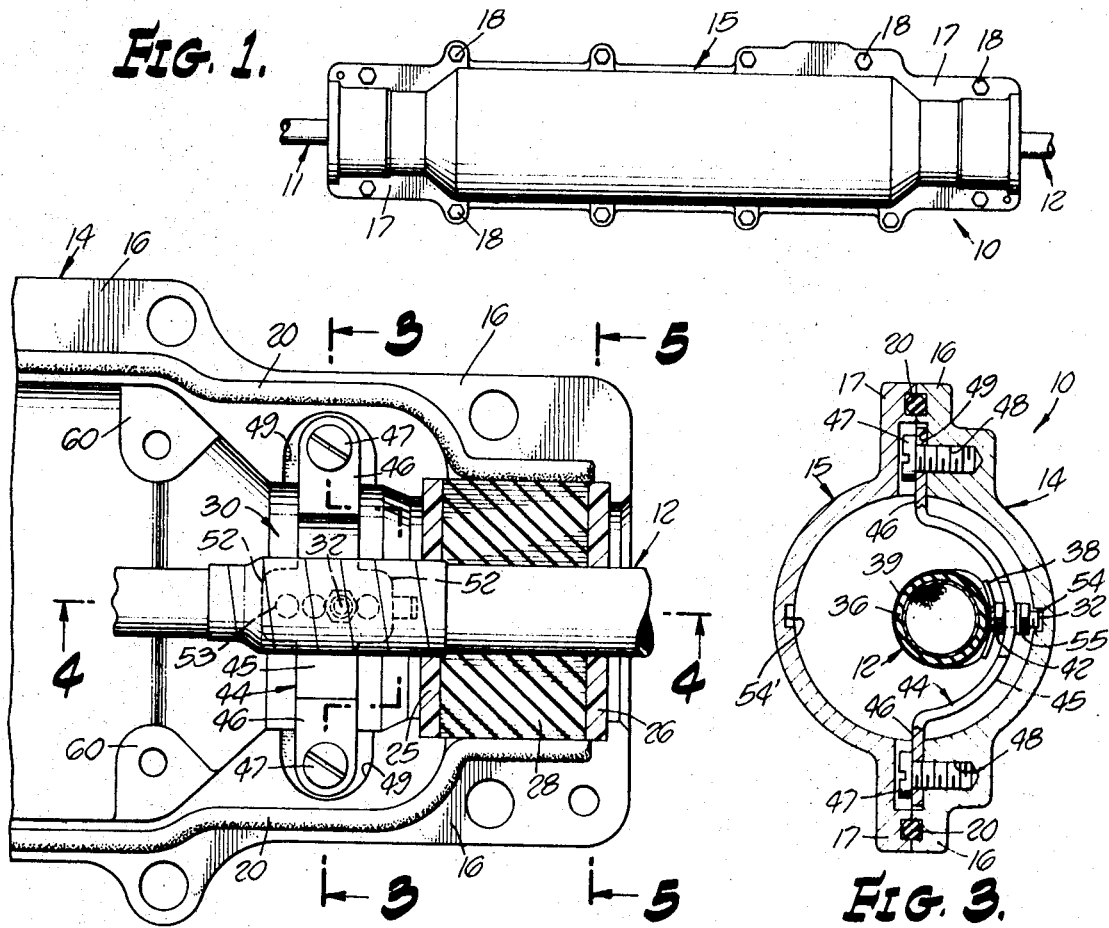
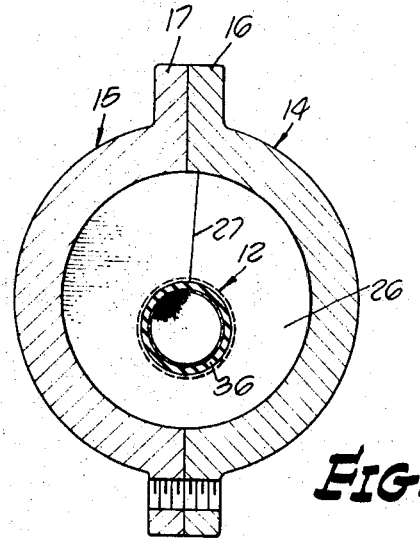
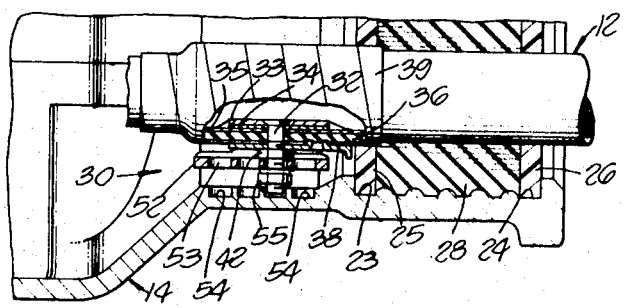

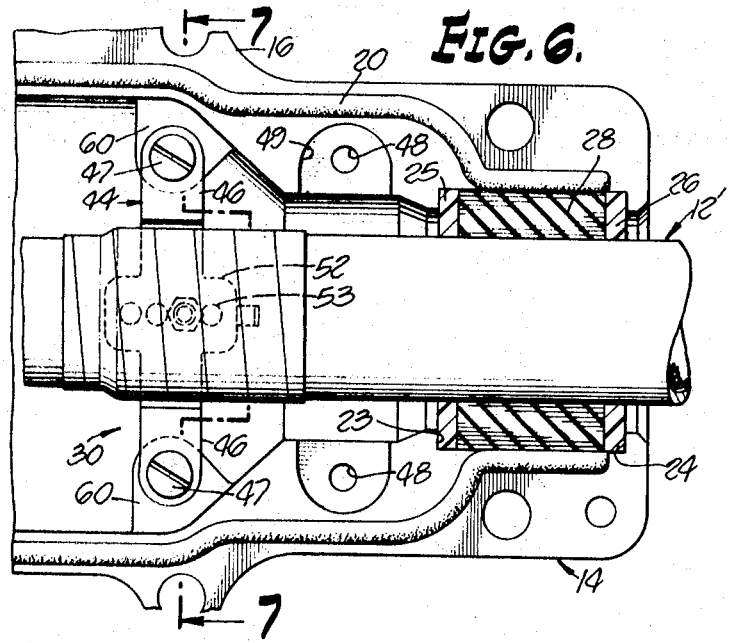
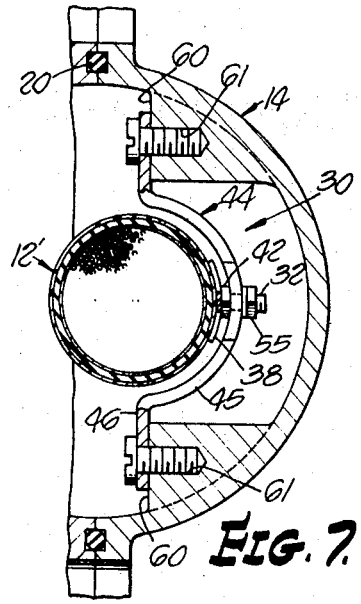
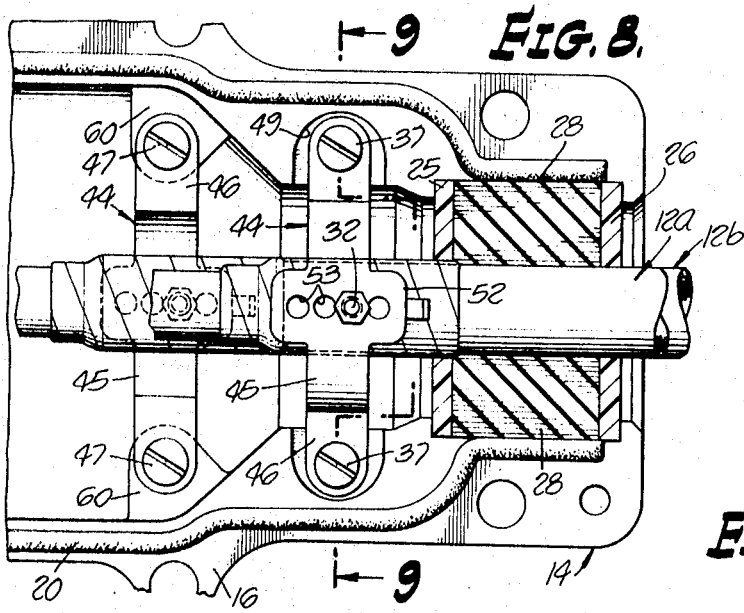
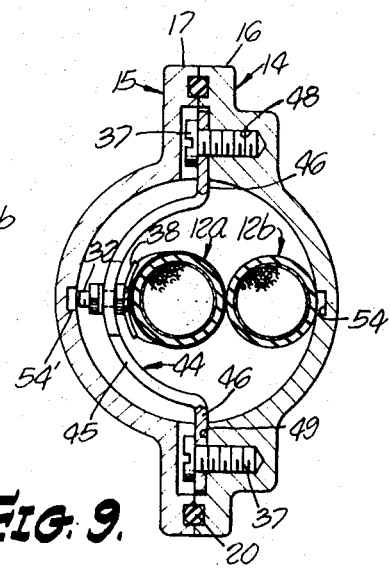
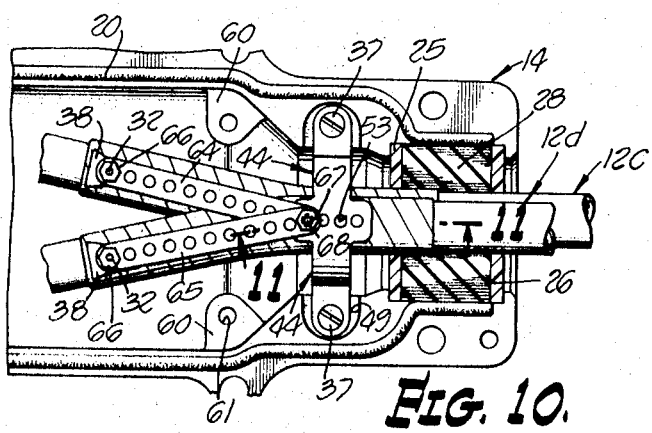
INVENTORS.
JOHN T. THOMPSON
GEORGE W. GILLEMOT
BY
ATTORNEYS

CABLE SPLICE CASING WITH CONDUCTIVE ANCHORAGE TO CABLE SHEATH AND SHIELD

This invention relates to cable splice assemblies and more particularly to improved means for enclosing a splice zone with a protective metallic splice casing having means for completing a high strength mechanical and electrical connection between the cable sheath and shield jackets and readily accommodating one or two cables at either end of the casing.

Multiple conductor communication cables are used in countless numbers in communication networks and have need for frequent splice connections with one another and with branchout cable lines. The completion of such splice connections necessitates removal of a length of the protective sheath and of the underlying electrical shield jacket to expose the conductors. These conductors are not intended to carry any substantial portion of the cable load and this is especially true as respects spliced conductors which must be isolated from such tensile stresses. For this reason it is important to provide a suitable strong load-carrying connection to the cable sheath as well as a positive electrical connection between the shield jackets to either side of the splice zone.

It is becoming increasingly common to employ splice zones with a metal protective casing cast in two semicylindrical halves securable together along their mating edges. Various proposals and designs have been advanced heretofore for utilizing these casing halves to provide electrical shielding around the splice connections as well as an electrical connection between the shield jackets of the cables entering the casing. However, the designs heretofore proposed for this purpose are subject to numerous shortcomings and disadvantages sought to be avoided by the present invention. One of the proposals presenting fewer problems than others involves the use of a split metal ring having arms projecting from its opposite ends. This ring is assembled about an exposed portion of the cable shield inwardly of the end of the splice casing and is so proportioned that when the casing halves are clamped together the arms are intended to engage opposed interior surfaces of the casing under pressure and in a manner contracting the clamp into firmer contact with the shield jacket with the ends of the arms bearing against the casing wall. It is at once apparent that the electrical connection provided in this fashion is unreliable and dependent on the resiliency of the material and various dimensional relationships of the components difficult to control. Particularly serious is the fact that it is impossible to observe the conditions of the parts during the final closing operation and likewise impossible to check the continuity of the connections prior to closing the casing. It is equally obvious that the parts can only be used with a particular size cable. Moreover two or more cables of the same or different sizes cannot be installed reliably through the same end of the casing using the described split ring-type grounding connector.

Another serious problem attending the use of devices heretofore proposed to anchor and ground cables to the splice housing is their complexity and the difficulties attending their installation.

It is therefore a primary purpose of the present invention to provide a simple improved cable anchorage and grounding assembly for use in splice assemblies avoiding the foregoing and other shortcomings of prior designs. The invention anchorage utilizes a pair of metal shoes and a clamping screw insertable through an opening in the sidewall of the cable shield and sheath and effective to hold the latter rigidly clamped together. The threaded screw used for the clamping operation is then inserted through an anchorage strap straddling the cable in an area inside one end of the splice casing and having its ends rigidly securable to the splice casing to either side of the cable. This anchorage strap is formed of strong metal and is deeply arched so as to straddle cables of various diameters and is sufficiently strong to transmit substantially the full tensile strength of the cable sheath to the splice casing. Additionally this metal anchorage provides a positive highly reliable electrical connection between the cable shield and the metal splice casing. Desirably, each end of the splice casing is provided with pairs of longitudinally offset seating supports and selectively usable as the cable anchorages. At least one set of these seats is preferably offset inwardly from the open face of the casing thereby adding materially to the versatility of the splice casing and to accommodate cables of widely varying diameters or two or more cables of the same or different diameters. The cable anchor straps are also preferably provided with a plurality of openings in any one of which the threaded stud clamped to the cable sheath can be inserted thereby compensating for tolerance variations, contraction and shrinkage of the cable sheath and other variables.

As will be recognized from the foregoing, the invention anchorages are installed on the cable sheath and shielding jacket and then clamped to one of the casing halves while the other half is detached. After these parts have been installed the operator may thoroughly check the installation both mechanically and electrically before securing the cover half in place.

It is therefore a primary object of the present invention to provide a new and improved cable splice assembly featuring a more versatile stronger, highly reliable, mechanical and electrical anchorage between the casing and the cable shield and sheath jackets.

Another object of the invention is the provision of a combined mechanical and electrical anchorage for a shielded cable having improved means for clamping the same to the cable jackets and to an anchorage for the cable.

Another object of the invention is the provision of a cable splice casing formed in two cast halves and featuring improved means for securing one of the halves to one or more cables of the same or different sizes entering either end of the casing Another object of the invention is the provision of an improved cable splice casing formed in seperable halves having simple, highly effective mechanical and electrical anchorage means readily connectable to either a cable sheath or shield jacket or to both without placing the conductors themselves under stress or strain.

These and other more specific objects will appear upon reading the following specifications and claims and upon considering in connection therewith the attached drawing to which they relate.

Referring now to the drawing in which a preferred embodiment of the invention is illustrated:

FIG. 1 is a side view of a typical embodiment of the invention splice assembly installed about a cable splice;

FIG. 2 is a longitudinal elevational view on an enlarged scale through one end of the assembly shown in FIG. 1 and showing the front half of the splice casing detached;

FIG. 3 is a cross-sectional view along the broken line indicated at 3—3 on FIG. 2 but showing the forward casing half in assembled position;

FIG. 4 is a cross-sectional view taken generally along line 4—4 on FIG. 2 and showing parts of the anchor assembly broken away;

FIG. 5 is a cross-sectional view taken along line 5—5 on FIG. 2;

FIG. 6 is a view similar to FIG. 2 but showing the cable anchor means installed in an alternate position;

FIG. 7 is a cross-sectional view taken along line 7—7 on FIG. 6;

FIG. 8 is a view similar to FIG. 6 but showing two small cables installed in the casing with each anchored to a different portion of the splice casing;

FIG. 9 is a cross-sectional view taken along the broken line 9—9 on FIG. 8;

FIG. 10 is a view similar to FIG. 8 but showing a different mode of anchoring a pair of cables to the splice casing; and FIG. 11 is a fragmentary cross-sectional view on an enlarged scale taken along line 11—11 on FIG. 10.

Referring initially and more particularly to FIGS. 1 to 5, there is shown a typical embodiment of the invention splice case assembly designated generally 10, installed over a splice between two aligned cables 11, 12 entering its opposite ends.

The splice case comprises a pair of cast semicylindrical metal halves 14, 15 having radial flanges 16, 17 projecting from their opposite sides and releasably clamped together by cap screws 18. The juxtaposed surfaces of flanges 16 and 17 are provided with mating channels seating a sealing gasket 20 in accordance with customary practice.

Additional sealing means for forming a hermetic seal between the casing halves and cabling entering their opposite ends is best shown in FIG. 4. Thus, the reduced diameter inlet collar at either end of the casing is formed with a pair of inwardly directed annular recesses 23, 24 seating gasket rings or washers 25, 26 flanked from suitable flexible insulating material, such as sheet plastic. These gasket rings are formed with openings sized to fit snugly about the particular cabling entering the splice casing and include a radial slit 27 running from the opening through one edge of the gasket, and facilitating the assembly of the gasket ring to the cable. The space between rings 25, 26 is filled with suitable sealing material such as a plastic buna tape or cording which is sufficiently plastic as to be readily distributed to fill the cavity between rings 25, 26 despite the fact the cable is offset very substantially to one side of the center of these rings.

The combination electrical and mechanical anchorage interconnecting the cable sheath and the splice casing, designated generally 30, comprises two principal subassemblies, the first including the components attached firmly to the cable shield and electrical shield, and the second including means interconnecting this first subassembly to the splice casing.

The above mentioned first subassembly includes a threaded shank 32 having its inner end fixed to an arcuate metallic shoe 33. Preferably a resilient metallic shim 34, supported by shoe 33, is formed with sharp tangs which penetrate any insulative film which may be present on the cable shielding jacket 35. It will be understood that this electrical shielding jacket is of the customary type surrounding the cable conductors and underlying the thick insulative sheath 36 of the cable. The threaded shank 32 extends through aligned openings formed in shield 35 and sheath 36 and then through an opening centrally of a metal clamping shoe 38 conforming to the external contour of the cable. The assembly of shank 32 from the inner ends of these aligned mounting openings is preferably performed in the manner disclosed in detail in our copending application for U.S. Letters Pat., Ser. No. 12,820, filed Feb. 19, 1970. The portion of the cable to either side of shank 32 is then served with snug convolutions of strong pressure sensitive tape 39 prior to the assembly of the outer clamping shoe 38. Thereafter, the clamping shoe is inserted over shank 32 and securely clamped in place by clamping nut 42.

From the foregoing it will be recognized that tightening of the clamping nut 42 serves to compress inner shoe 34 and outer shoe 38 against the intervening electrical shield jacket 35 and cable sheath 36 thereby providing an extremely high strength mechanical connection to these two layers as well as an electrical connection between shoe 33, shield jacket 35 and shank 32.

The second anchorage or companion subassembly comprises a heavy gauge metal strap 44 having an arched portion 45 interposed between oppositely directed ends 46 formed with openings for clamping screws 47, 47. Screws 47 seat in threaded bores 48 (FIG. 3) formed in flanges 16, 16 of casing half 14 and opening into shallow recesses 49. Anchor strap 44 is preferably provided with aligned projections 52 projecting from its opposite lateral sides and formed with a series of holes 53 any one of which may be assembled about threaded shank 32 of the first described anchor subassembly and clamped tightly in place by a nut 55 (FIG. 3, 4). As is best shown in FIG. 4, the splice casing is formed with shallow wells or detent means 54 aligned with openings 53 and adapted to loosely receive the outer end of shank 32. It will therefore be evident that irrespective of which of openings 53 is used to accommodate shank 32 the outer end of the shank will extend into one of the wells 54. It will be understood that these wells or detents cooperate with the shank in strengthening and stabilizing the anchor assembly in response to tension forces commonly acting along the cables entering the ends of the splice casing.

Referring now to FIGS. 6 and 7, the described anchorage assembly 30 is shown installed in the same splice casing to provide an electrical and mechanical anchorage between a much larger cable and casing half 14. In this particular installation however, the ends 46 of the cable anchorage strap 44 are supported on a pair of bosses 60 formed integral with casing half 14 in an area spaced axially inwardly of mounting recesses 49 on which the strap is shown supported in FIGS. 1–4. Each of these bosses is formed with a threaded well 61. It will be noted from FIG. 7 that the upper ends of bosses 60 are coplanar with one another and located in a plane spaced substantially below the level of the mounting surfaces 49. This arrangement not only facilitates the accommodation of a considerably larger cable but also permits a small diameter cable to enter the same end of the splice housing as will be described presently in connection with FIGS. 8 and 9. It will be understood that the cable shield and sheath are anchored to strap 44 by a clamping subassembly of the same construction described above in connection with FIGS. 1–5.

Referring now to FIGS. 8 and 9, the splice casing and anchorage is shown in use with two cables 12a, 12b of relatively small diameter entering the same end of the splice casing in closely spaced side by side relation. Separate identical anchorage assemblies to those described above are employed for the respective cables. As shown, the anchorages are installed on the remote sides of the two cables 12a, 12b with the arched portion of the two straps facing toward one another and positioned for the securement of their ends to a respective set of the threaded wells 48, 48 and 61, 61. Thus, the arched portion of the anchorage for cable 12a faces upwardly or to the left as viewed in FIG. 9, whereas the corresponding anchorage strap 44 for cable 12b underlies this cable as shown in FIG. 8 with its outer ends secured to bosses 60 by anchor screws 47.

The cables enter the splice casing through appropriately contoured gaskets 25, 26 and the plastic packing material 28 is distributed therebetween in a manner completely filling the space between the cable, gaskets 25, 26 and the interior sidewalls of the end portions of the splice casing to provide a hermetic seal.

Referring now to FIGS. 10 and 11, there is shown one manner in which a single anchor strap 44 can be employed to anchor a pair of smaller diameter cables 12c, 12d to splice casing half 14. In this case the anchor subassemblies providing an anchorage connection to each of the cable shields and sheaths are installed on a portion of each of the cable sheaths located substantially inwardly of the inlet ends of the casing halves 14, 15, as for example forwardly of anchor bosses 60, 60. As shown, anchor strap 44 is secured in place in clamping recesses 49 following which its midportion is rigidly connected to the threaded shanks 32, 32 by metal straps 64, 65 each provided with closely spaced holes. A hole at the inner ends of each strap is secured to a respective threaded shank, as by clamping nuts 66, and the other ends are secured by a common nut and bolt assembly 67, 68 to one of the holes 53 in anchor strap 44. Desirably the outer ends of bolts 68 project into one of the shallow wells 54' in cover half 15 and serve to strengthen and stabilize the adjacent portions of the anchorage assembly.

While the particular cable splice casing with conductive anchorage to cable sheath and shield herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

1. In combination with a metallic cable splice casing of the type formed in two semitubular halves normally held secured together along their mating longitudinal edges and enclosing cable splice connections between cables entering the opposite ends of said casing and which cables are of the type having an electrical shield jacket enclosed by a sheath jacket, that improvement which comprises: metallic anchor means securing one of said cable sheaths and the underlying conductive electrical shield jacket thereof rigidly to one of said casing halves, said metallic anchor means including (1) a threaded shank means passing through inner and outer shoe means between which said cable shield and sheath jackets are firmly clamped by said threaded shank means and (2) conductive strap means clamped to said threaded shank means and at least one of its ends clamped to one side of one of said casing halves, said anchor means being sufficiently strong to transfer tension forces acting along the portion of the cable entering the end of said casing to said casing and serving additionally to provide a positive and highly reliable electrical connection between said cable electrical shield jacket and said metallic splice casing.

2. The combination defined in claim 1 characterized in that said conductive strap means includes a strong metal strap having the mid portion thereof rigidly connected to the cable sheath and the underlying electrical shield jacket via said threaded shank, and fastener means detachably anchoring the opposite ends of said strap to one of said casing halves at points spaced to either side of the cable.

3. The combination defined in claim 2 characterized in that said one casing half is formed with threaded bores along the opposite sides of said one cable for seating threaded cap screws forming a part of the means for clamping the ends of said metallic strap to said casing half.

4. The combination defined in claim 2 characterized in that said one casing half is formed with detent means positioned opposite the mid portion of said metal strap and located beside the outer end of the threaded shank means securing said strap to the cable sheath and in position to stabilize said anchor means when the cable is under load lengthwise thereof.

5. The combination defined in claim 2 characterized in that said metal strap is arched in the mid portion thereof with the opposite ends projecting away from one another and lying in a common plane.

6. The combination defined in claim 2 characterized in that said strap means is spaced inwardly from the end of said casing and inwardly from fluidtight packing means embracing the cable crosswise of the interior end portion of said casing.

7. The combination defined in claim 1 characterized in the provision of metallic means electrically connecting the opposite end of said splice casing to the electrical shield jacket of the cable entering said opposite end of the splice casing.

8. The combination defined in claim 1 characterized in the provision of similar metallic anchor means between each end of the splice casing and the sheath and electrical shield jacket of the cable entering each end of the casing whereby said casing is effective to provide a mechanical load transfer connection between the cable sheaths and a positive electrical connection between the electrical shield jacket underlying the sheath of each cable.

9. The combination 8 defined in claim 8 characterized in that said anchor means for the cable entering each end of said casing includes high-strength fastener means secured to the opposite ends of the same casing half.

10. The combination defined in claim 1 characterized in that said one casing half includes a plurality of sets of different seating areas adjacent the same end of the splice casing against which said cable anchor means is selectably anchorable.

11. The combination defined in claim 10 characterized in that said each set of seating areas for said anchor means is located in a plane generally parallel to but spaced different distances from the plane of the open side of one of said casing halves.

12. The combination in claim 11 characterized in the provision of a separate cable anchor means secured to a different set of said seating areas each anchored to the sheath of a separate cable entering the adjacent end of said splice casing in side-by-side relation.

13. A cable splice casing as defined in claim 1 characterized in that said strap means has a plurality of holes spaced therealong to any one of which said threaded shank is clampable.

14. The combination defined in claim 1 characterized in that said strap means includes a generally rigid inflexible first strap having its opposite ends anchored to a casing half in an area to either side of the cable, and a second strap extending generally parallel to the cable with one end clamped to said threaded shank and the other end clamped to said first strap.

15. In combination, a cable splice casing formed in two mating halves cooperating to provide a cable inlet opening at either end thereof, said casing halves having a plurality of diametrically related sets of threaded bores opening into the interior thereof each seating a cap screw, said sets of bores lying in separate planes parallel to and spaced different distances from the mating plane of said casing halves, said sets of bores also being spaced different axial distances from the adjacent end of said splice casing, a separate heavy gauge metal strap for each set of said bores having an arched midportion and holes in the ends thereof each seating the shank of a respective one of said cap screws, and clamping shoe means secured to the arched portion of each of said straps and including means for anchoring a cable sheath rigidly thereto by compressing a portion of a cable sheath between said clamping shoe means without compressing portions of the cable conductors radially inward of said clamping shoe means.

16. The combination defined in claim 15 characterized in that the arch portion of one of said arched straps faces in the opposite direction from the arch of another of said arched straps.

17. The combination defined in claim 13 characterized in that the arched portion of one of said arched straps is provided with a plurality of holes usable selectively to secure said clamping shoe means to said strap.

18. The combination defined in claim 17 characterized in that said casing half is provided with a plurality of shallow wells opening radially into the interior of said casing half and in radial alignment with a respective one of said openings in the arched portion of said strap.

19. The combination defined in claim 15 characterized in that said clamping shoe means includes large-area rigid metallic inner and outer shoes, said inner shoe being insertable between the cable conductors and against the interior surface of a metallic shield jacket for the conductors and said outer shoe being designed for placement against the exterior side of a cable sheath in an area radially opposite said inner shoe, and a threaded shank assembled through said inner and outer shoes and adapted to sandwich a cable sheath and effective when a nut on the outer end of said shank is tightened to compress a cable shield and sheath between said inner and outer shoes to provide a strong mechanical anchorage to a cable and an excellent high-capacity electrical connection to a cable shield.

20. The combination defined in claim 19 characterized in that the interior of said casing half is provided with a shallow well in radial alignment with the opening in the arched portion of said strap and seating the outer end of said threaded shank when the latter is clamped to said strap and said strap is secured to said casing half by said cap screws.